United States Patent
Sotiropoulou et al.

(10) Patent No.: US 9,850,806 B2
(45) Date of Patent: *Dec. 26, 2017

(54) ACTIVE SCAVENGE PRECHAMBER

(71) Applicant: Prometheus Applied Technologies, LLC, Fort Collins, CO (US)

(72) Inventors: Maria Emmanuella Sotiropoulou, Fort Collins, CO (US); Luigi P. Tozzi, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/207,029

(22) Filed: Mar. 12, 2014

(65) Prior Publication Data

US 2014/0261296 A1 Sep. 18, 2014

Related U.S. Application Data

(60) Provisional application No. 61/778,266, filed on Mar. 12, 2013.

(51) Int. Cl.
*F02B 19/12* (2006.01)
*F02B 19/18* (2006.01)
(Continued)

(52) U.S. Cl.
CPC .......... *F02B 19/18* (2013.01); *F02B 19/1014* (2013.01); *F02B 19/12* (2013.01);
(Continued)

(58) Field of Classification Search
CPC ...... F02B 19/00; F02B 19/08; F02B 19/1004; F02B 19/1014; F02B 19/1019;
(Continued)

(56) References Cited

U.S. PATENT DOCUMENTS

| 1,930,003 A | * | 10/1933 | Erny | ................ H01T 13/14 123/169 C |
| 1,945,870 A | * | 2/1934 | Stephenson | ............. H01T 13/54 138/41 |

(Continued)

FOREIGN PATENT DOCUMENTS

WO    2012091739 A2    7/2012

OTHER PUBLICATIONS

PCT International Search Report of International Application No. PCT/US14/24904 filed on Mar. 12, 2014. 15 Pages.

*Primary Examiner* — Sizo Vilakazi
*Assistant Examiner* — Kevin R Steckbauer
(74) *Attorney, Agent, or Firm* — Barcelo, Harrison & Walker, LLP

(57) ABSTRACT

In certain embodiments with large size prechambers and/or with prechambers that have large spark-gap electrode assemblies, a poor scavenge of the crevice volume may cause deterioration of the preignition margin, which then may limit the power rating of the engine, may cause the flow velocity field of the fuel-air mixture to be excessively uneven and may result in the deterioration of the misfire limit. One or more auxiliary scavenging ports may allow admission of fuel rich mixture to the crevice volume, thereby cooling the residual gases and preventing occurrence of preignition. More organized and powerful flow velocity fields may be obtained in the spark-gap electrode assembly region. This condition may result in a significant extension of the flammability limit and may significantly improve the combustion efficiency of the prechamber. Passive prechambers using the active scavenge concept may increase the engine power output and reduce the emission of pollutants from engine combustion.

13 Claims, 9 Drawing Sheets

(51) Int. Cl.
*F02B 19/10* (2006.01)
*F02B 19/08* (2006.01)
*F02B 19/16* (2006.01)

(52) U.S. Cl.
CPC ........... *F02B 19/08* (2013.01); *F02B 19/1019* (2013.01); *F02B 19/16* (2013.01); *Y02T 10/125* (2013.01)

(58) Field of Classification Search
CPC ...... F02B 19/1061; F02B 19/12; F02B 19/16; F02B 19/18; F02P 9/00; F02P 13/00; H01T 13/54; F02M 57/06
USPC ... 123/260, 266, 268, 287, 293, 297, 169 R, 123/169 EL
See application file for complete search history.

(56) References Cited

U.S. PATENT DOCUMENTS

| | | | | |
|---|---|---|---|---|
| 4,119,065 A * | 10/1978 | Noguchi | ............ | F02B 19/1066 123/262 |
| 4,128,081 A * | 12/1978 | Noguchi | ............ | F02B 19/1066 123/262 |
| 4,646,695 A * | 3/1987 | Blackburn | ............ | F02B 19/12 123/256 |
| 5,555,867 A * | 9/1996 | Freen | ............ | F02B 19/08 123/260 |
| 7,243,634 B2 * | 7/2007 | Tourteaux | ............ | F02B 17/005 123/261 |
| 7,659,655 B2 * | 2/2010 | Tozzi | ............ | F02B 19/08 123/266 |
| 8,584,648 B2 * | 11/2013 | Chiera | ............ | H01T 13/54 123/253 |
| 8,839,762 B1 * | 9/2014 | Chiera | ............ | F02B 19/108 123/256 |
| 9,004,042 B2 * | 4/2015 | Tozzi | ............ | F02B 19/12 123/260 |
| 9,172,217 B2 * | 10/2015 | Hampson | ............ | H01T 13/54 |
| 2004/0100179 A1 * | 5/2004 | Boley | ............ | H01T 13/54 313/143 |
| 2005/0211217 A1 * | 9/2005 | Boley | ............ | F02B 19/12 123/266 |
| 2011/0148274 A1 * | 6/2011 | Ernst | ............ | H01T 13/467 313/141 |
| 2014/0102404 A1 * | 4/2014 | Sotiropoulou | ............ | F02B 19/1014 123/260 |

* cited by examiner

ACTIVE SCAVENGE PRECHAMBER

I. CROSS-REFERENCE TO RELATED APPLICATIONS

This application claims priority to U.S. Patent Application No. 61/778,266, entitled "Active Scavenge Prechamber," and filed on Mar. 12, 2013; which is related to U.S. patent application Ser. No. 13/602,148 ('148 Application), entitled "Method and apparatus for achieving high power flame jets while reducing quenching and autoignition in prechamber spark plugs for gas engines," and filed on Sep. 1, 2012 and International Patent Application Number PCT/US2012/53568 ('568 Application), entitled "Method and apparatus for achieving high power flame jets while reducing quenching and autoignition in prechamber spark plugs for gas engines," and filed on Sep. 1, 2012, both of which claim priority to U.S. Patent Application No. 61/573,290 ('290 Application), entitled "Method and apparatus for achieving high power flame jets while reducing quenching and autoignition in prechamber spark plugs for gas engines," and filed on Sep. 3, 2011. This application is also related to International Patent Application Number PCT/US2011/002012 ('012 Application), entitled "Prechamber Ignition System," and filed on Dec. 30, 2011, which claims priority to U.S. Patent Application No. 61/460,337, entitled "High efficiency ricochet effect passive chamber spark plug," and filed on Dec. 31, 2010. The entirety of each of the foregoing patent applications is incorporated by reference herein to the extent consistent with the present disclosure.

II. FIELD OF THE INVENTION

The disclosure generally relates to systems and methods for an active scavenging prechamber, and more particularly to an active scavenging prechamber that improves the combustion efficiency of a prechamber, increases the engine power output and reduces the emission of pollutants from engine combustion.

III. BACKGROUND OF THE INVENTION

Large gas engines with cylinder bore diameter greater than 200 mm typically use fuel-fed, rich precombustion chambers to enhance flame propagation rate with lean air/fuel mixtures in the main combustion chamber. Passive prechambers for internal combustion engines defined as precombustion devices with no direct fuel admission may be used with gas engines. While these concepts have proven to be very effective in relatively small displacement engines and with not so massive spark-gap electrode assemblies, their performance with larger displacement, higher power density engines and with more massive spark-gap electrode assemblies needs to be substantially improved.

IV. BRIEF DESCRIPTION OF THE DRAWINGS

FIG. 1 depicts a passive precombustion chamber in accordance with certain embodiments.

FIGS. 2a-b depicts two exemplary passive precombustion chambers in accordance with certain embodiments.

V. DETAILED DESCRIPTION

Figure 1:
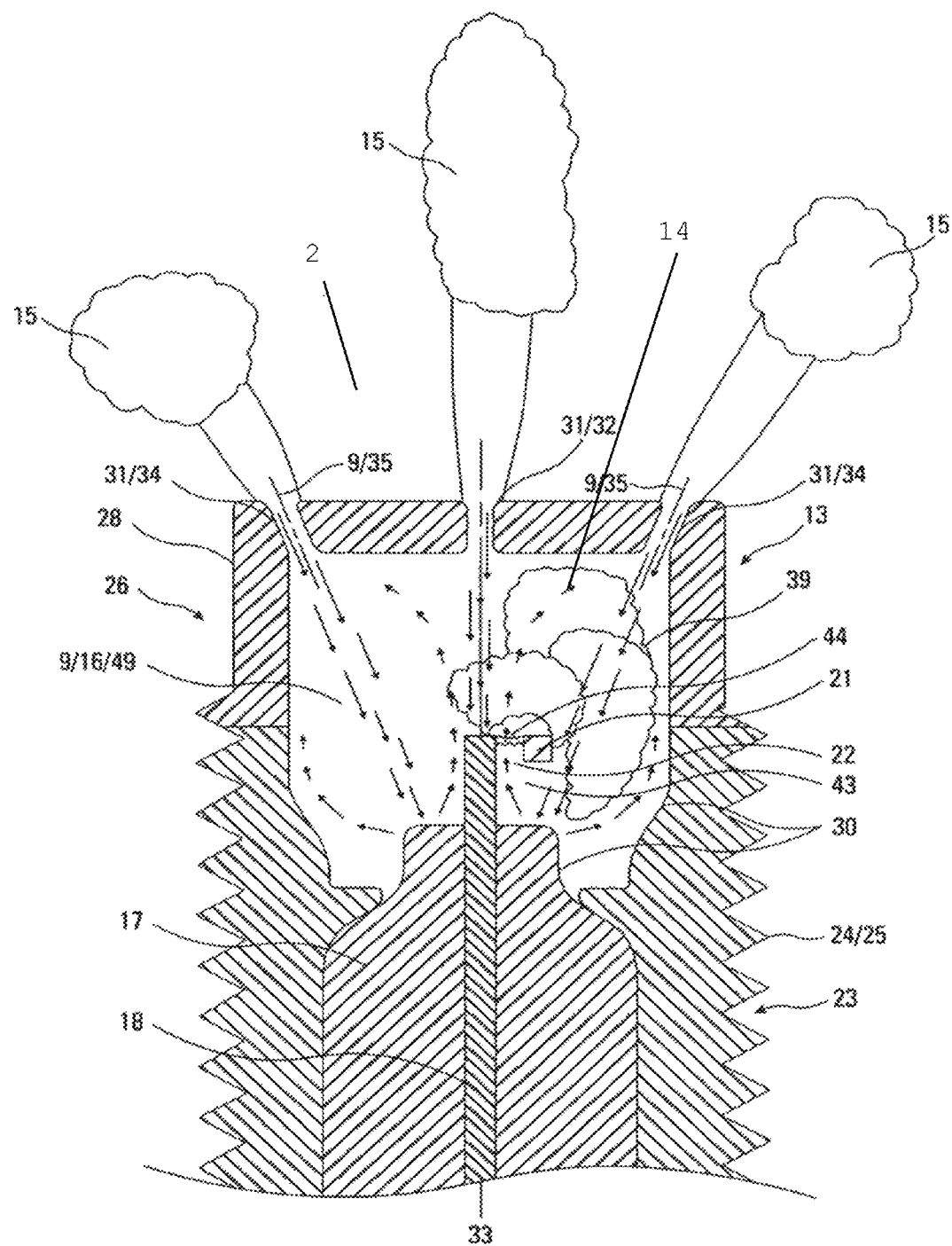

Exemplary passive prechamber ("PPC") spark plugs are shown in FIG. 1 and FIG. 2. The passive prechamber spark plug shown in FIG. 1 is described and claimed in the '012 Application. FIG. 1 illustrates a pre-chamber unit providing a pre-combustion chamber (13). The pre-combustion chamber (13) can be formed by the shell (23) extending outwardly to at least partially enclose the central electrode (18) and the grounded electrode (21). As to particular embodiments, the pre-combustion chamber (13) can be formed by coupling a pre-combustion chamber element (26) to the base of the shell (23). The various embodiments of the pre-combustion chamber (13) can have a pre-combustion chamber wall (27) having pre-chamber external surface (28) disposed toward the internal volume of the main combustion chamber. The pre-combustion chamber internal surface (30) includes the corresponding internal surface of the shell (23), the pre-combustion chamber element (26), the central insulator (17), or other internal surfaces which enclose a pre-combustion chamber volume (29) (individually and collectively referred to as the "internal surface" (30)).

The internal surface (30) of the pre-combustion chamber (13) whether formed by extension of the shell (23) or by coupling of a pre-combustion chamber element (26) to the base of the shell (23), or otherwise, can further provide one or more induction-ejection ports (31) (also referred to as "scavenging ports") which communicate between the pre-combustion chamber external surface (28) and the pre-combustion chamber internal surface (30) of the pre-combustion chamber (13). The one or more scavenging ports (31) can be configured to transfer an amount of the fuel-oxidizer mixture (9) from the main combustion chamber into the pre-combustion chamber (13) and to deploy flame jets (15) from the pre-combustion chamber (13) into the main combustion chamber.

Combustion of the amount of fuel-oxidizer mixture (9) inside of the pre-combustion chamber (13) can be initiated by generation of a spark across the electrode gap (22). The scavenging ports (31) can be configured to deploy flame jets (15) into the main combustion chamber at a location which results in combustion of the amount of fuel-oxidizer mixture (9) within the main combustion chamber.

As shown in FIG. 1, flame growth (39) in a pre-combustion chamber (13) having a flow field (14). Firstly, flow field forces (16) in the electrode gap (22) can be sufficient to move the flame kernel (44) within the electrode gap (22) away from the internal surface (30) (for example, the central insulator (17) and shell (23)) which can impede, arrest, or slow (collectively "quench") flame growth (39). By reducing interaction or engulfment of the flame kernel (44) with the internal surface (30) of the pre-combustion chamber (13) that quenches flame growth (39) there can be a substantial increase in the rate of combustion of the fuel-oxidizer mixture (9) in the pre-combustion chamber (13). The movement of the flame kernel (44) toward greater fuel concentration inside of the pre-combustion chamber (13) can result in substantially increased combustion rates of the fuel-oxidizer mixture (9) inside of the pre-combustion chamber (13) and substantially greater momentum of flame jets (15) deployed into the main combustion chamber of an engine. The structure of the pre-combustion chamber (13) and scavenging ports (31) can achieve sufficient ricochet effect to generate embodiments of the inventive flow field (14) inside of the pre-combustion chamber (13) having sufficient flow field forces (16) to generate a counter flow region (43) in the electrode gap (22) and even extending about the first electrode (18) and the second electrode (21). An axial induction port (32) can be substantially axially aligned with the central longitudinal axis (33) of the pre-chamber unit (2). As to certain embodiments, one or more side induction ports (34) can be disposed in radial spaced apart relation about the central longitudinal axis (33).

Certain embodiments of the invention can provide both an axial induction port (32) and one or more side induction ports (34); however, the invention is not so limited, and particular embodiments of the invention may only provide an axial induction port (32) or only side induction ports (34) depending on the application. Upon compression of the amount of fuel-oxidizer mixture (9) in the main combustion chamber, a portion of the amount of fuel-oxidizer mixture (9) can pass through the axial induction port (32) and the side induction ports (34) as a corresponding one or more in-filling streams (35). The in-filling streams (35) of the fuel-oxidizer mixture (9) can create the flow field (14) having flow field forces (16) (shown in FIG. 1 by arrow heads pointing in the direction of flow and the velocity being greater with increasing length of the arrow body which allows comparison of conventional flow fields and inventive flow fields) inside of the pre-combustion chamber volume (29).

Figure 2A:
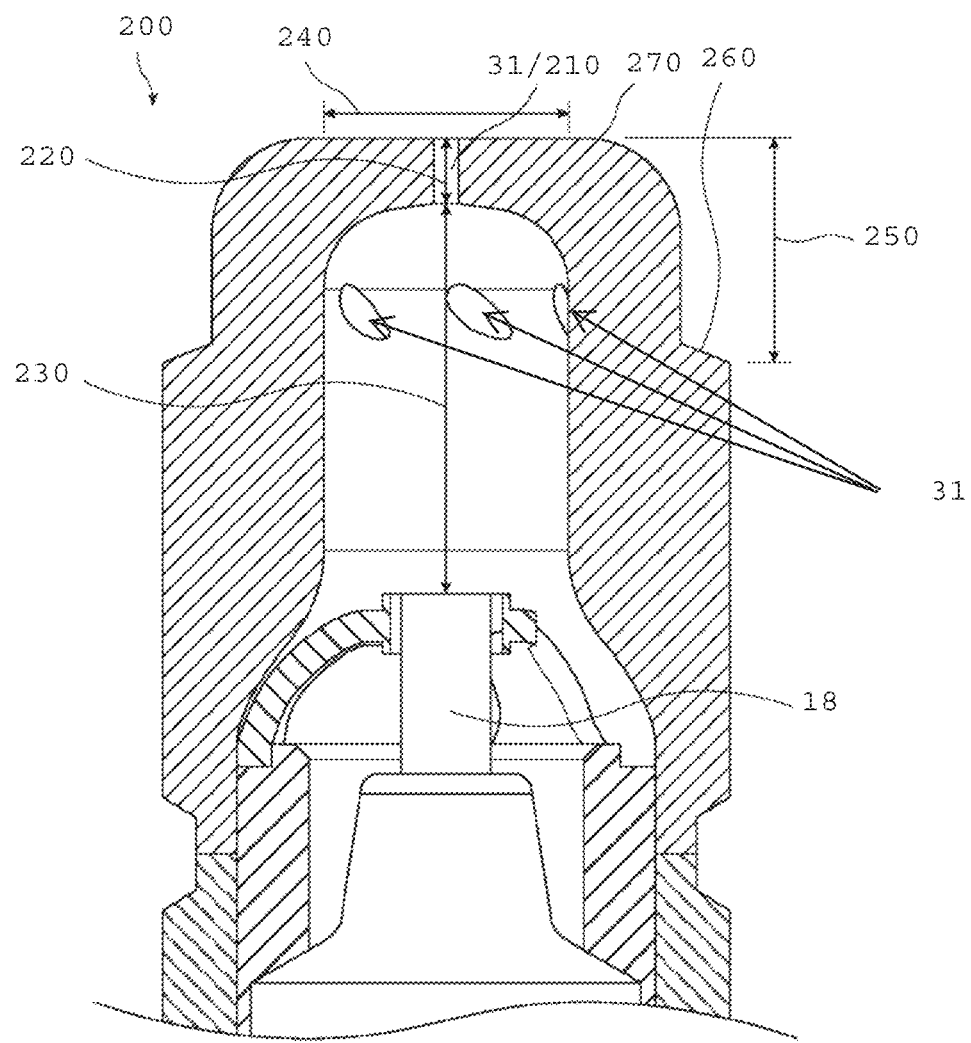

FIG. 2a shows an exemplary passive prechamber spark plug as described and claimed in the '568 Application. In certain embodiments as shown in FIG. 2a, pre-combustion chamber (200) may include a center induction port (210) with an induction port length (220). In certain embodiments, the center hole length may be from about 1 mm to about 13 mm. In certain embodiments, a pre-combustion chamber ceiling distance ("L") (230) from center electrode (18) may be from about 5 mm to about 85 mm. In certain embodiments, a pre-combustion chamber inner diameter ("D") (240) may be from about 4 mm to about 35 mm. In certain embodiments, a pre-combustion chamber insertion depth (250) from cylinder head firing deck (260) to the top (270) of the pre-combustion chamber (200) may be from about 0 mm to about 25 mm.

Figure 2B:
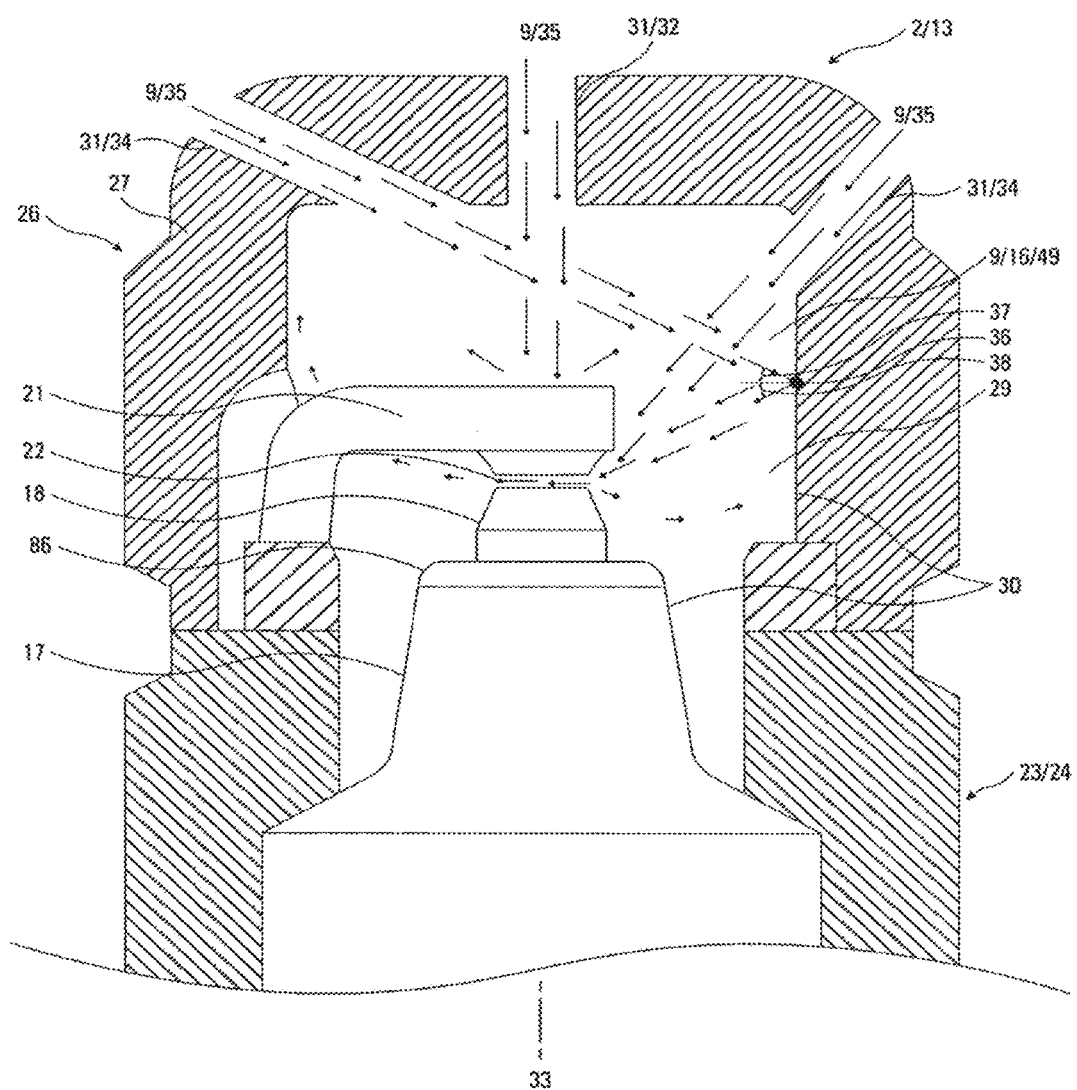

FIG. 2b shows an exemplary passive prechamber spark plug as described and claimed in the '012 Application. The arrows represent the directions and velocities of an embodiment of the inventive flow field forces (49) in the electrode gap (22) of a J-gap electrode in embodiments of the inventive pre-combustion chamber unit (13), which have achieved the ricochet effect in relation to the electrode gap (22) of a J-gap electrode. As shown, the inventive flow field forces (49) and the corresponding inventive flow field (14) can have comparatively greater organization or uniformity with the direction of flow of the fuel-oxidizer mixture (9) in substantially one direction, with greater velocity, and outward from the electrode gap (22) and quenching surfaces, or combinations thereof. This can reduce quenching of the flame kernel (44) (shown in FIG. 1) as there are sufficient flow field forces (16) to quickly move the flame kernel (44) away from the surfaces.

The pre-combustion chamber (13) and induction ports (31)(34) can be configured in regard to one or more aspects as above described to achieve ricochet of the in-filling streams (35) from one or more point locations (36) on the internal surface (30) of the pre-combustion chamber (13) which enclose a first electrode (18) and a second electrode (21) in a J-gap configuration. As shown, a particular embodiment can include an axial induction port (32), which directs an in-filling stream (35) toward the second electrode (21) (also referred to as a ground strap). One or more side induction ports (34) can be configured to direct in-filling streams (35) towards corresponding point locations (36) on the opposing internal surface (30) of the shell (23). The shell (23) may provide a shell external surface (24) configured to sealably mate with the cylinder head of the engine, typically by mated spiral threads (25) which draw the sealing surfaces together to dispose the pre-combustion chamber (13) of the pre-chamber unit (2) in proper relation to the main combustion chamber for ignition of the fuel-oxidizer mixture (9) therein. The configuration of the one or more side induction ports (34) can result in an angle of incidence (37) and an angle of deflection (38) in relation to the one or more point locations (36) to ricochet toward the electrode gap (22). Additionally one or more side induction ports (34) can be directed toward the electrode gap (22). The combined effect of the ricocheted and directed in-filling streams (35) can generate advantageous inventive flow field forces (49) and inventive flow fields (14) in the pre-combustion chamber (13) enclosing first and second electrodes (18)(21) in the J-gap form. The comparatively greater velocity of the fuel-oxidizer mixture (9) moving toward and approaching internal surface (30) of the pre-combustion chamber (13) (as shown in the example of FIG. 1), such as the central insulator (17) (including any one or more of the nose (86), lower corner of the nose, the side surface of the nose as shown in FIG. 2b), can upon ignition correspondingly move or locate the flame kernel (44) toward the quenching surfaces of the central insulator (17) as compared to the inventive flow field forces (16) which has a lesser velocity of the fuel-oxidizer mixture (9) moving toward and approaching the internal surface (30) of the pre-combustion chamber (13), which upon ignition comparatively locates the flame kernel (44) further away from quenching surface of the central insulator (17) (as shown in the example of FIG. 2b).

Figure 3:
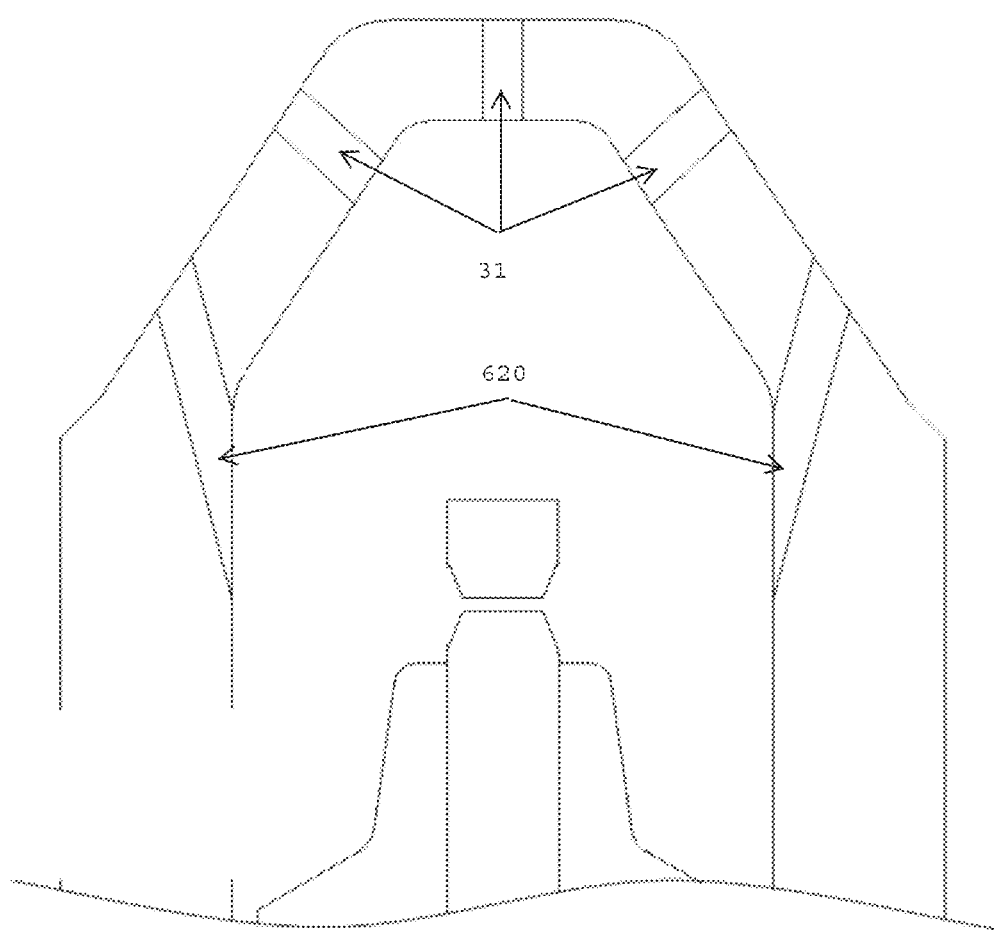
FIG. 3 depicts a prechamber spark plug with a large prechamber volume in accordance with certain embodiments.
Figure 4:
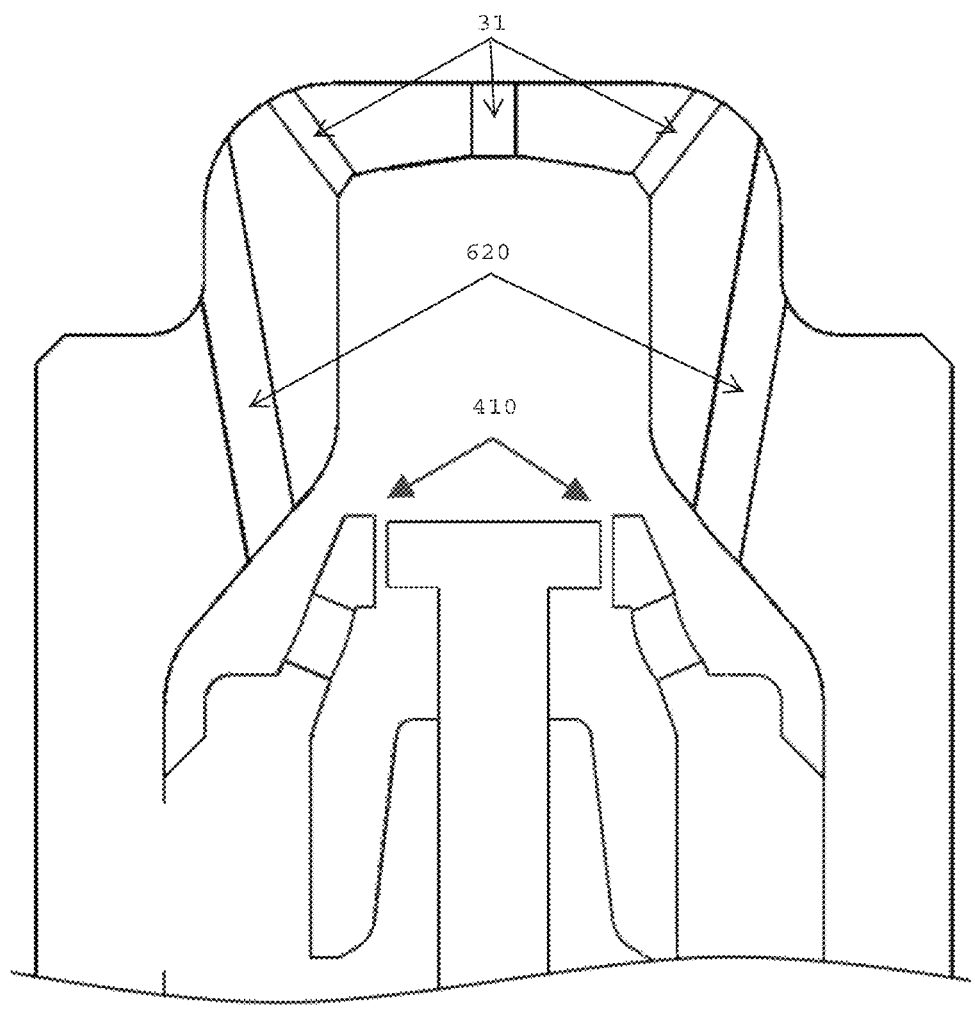
FIG. 4 depicts a prechamber spark plug with a large spark-gap electrode assembly in accordance with certain embodiments.
Figure 5:
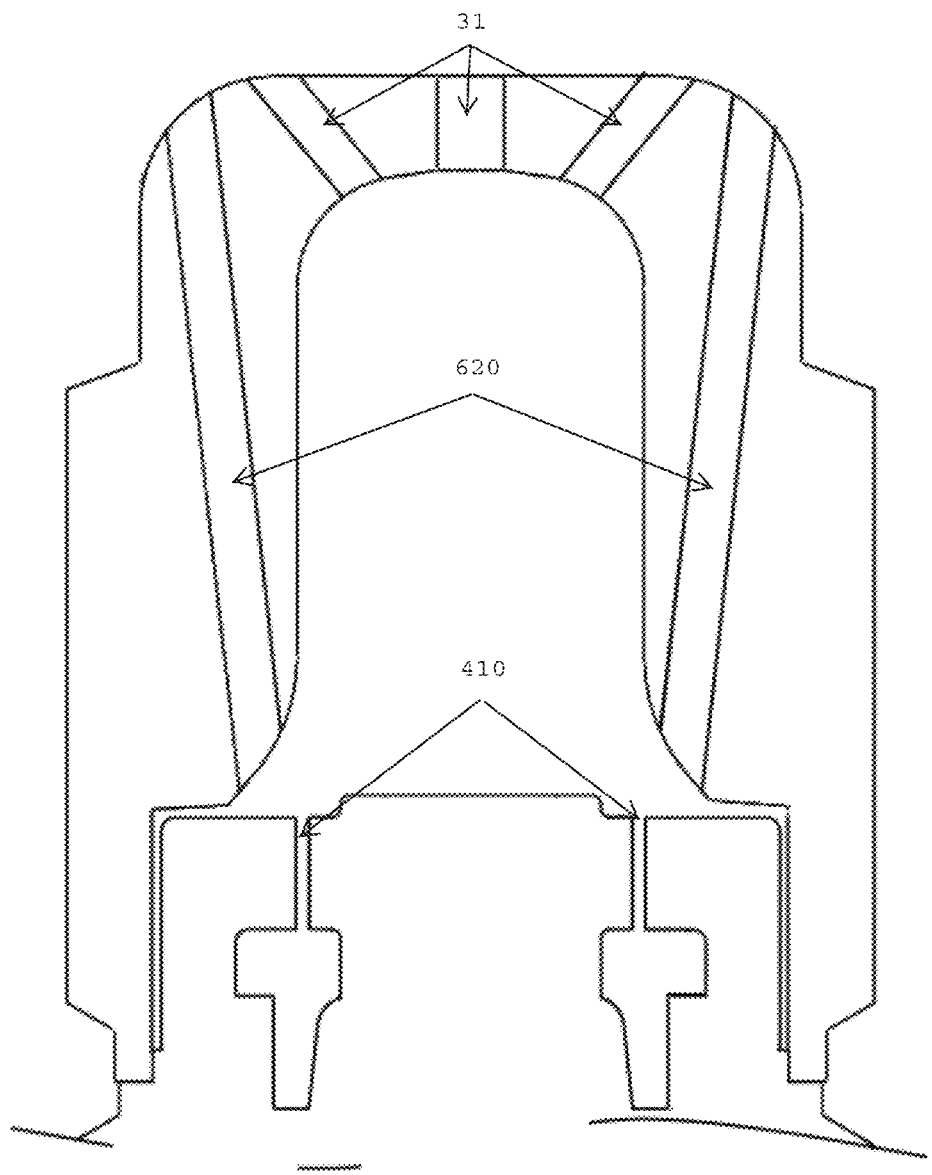
FIG. 5 depicts a prechamber spark plug with a large prechamber volume and a large spark-gap electrode assembly in accordance with certain embodiments.

Exemplary non-limiting examples of PPC spark plugs are disclosed in the related '148, '568, and '012 applications, which are incorporated by reference herein. In certain embodiments, improvements in performance can be achieved with larger prechamber volumes as shown in FIG. 3, or with larger spark-gap electrode assemblies (410) as shown in FIG. 4, or with combinations of larger prechamber volumes and larger spark-gap electrode assemblies as shown in FIG. 5.

However, these configurations may have inadequate scavenging of the region remote from the scavenging/ejection ports. This condition can be significantly improved with the novel concept of "active scavenge" in accordance with certain embodiments.

Figure 6:
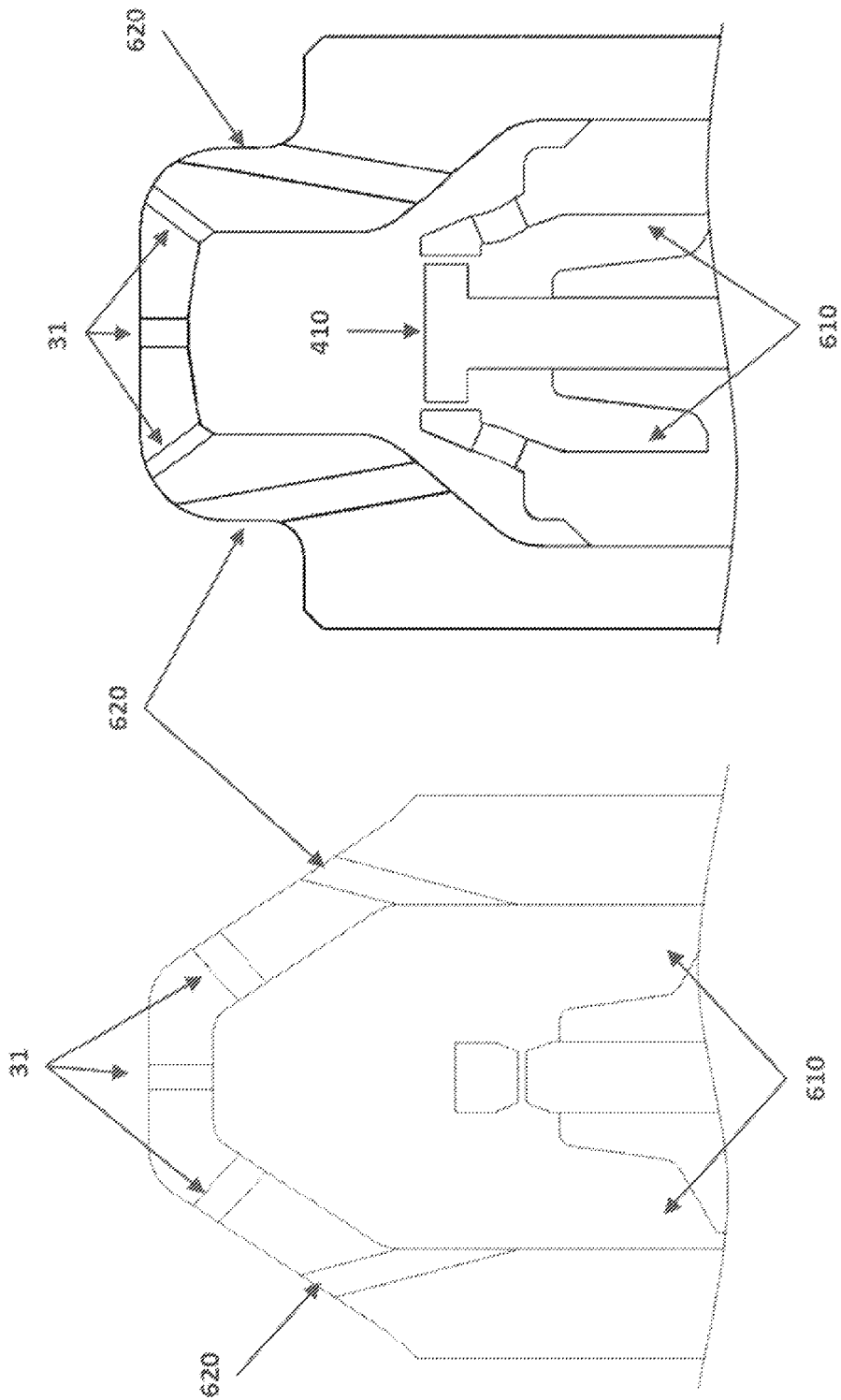
FIG. 6 depicts prechamber spark plugs including auxiliary scavenging ports in accordance with certain embodiments.

In certain embodiments, the active scavenge concept may be based on creating auxiliary scavenging ports (620) for admitting fuel rich gas mixtures into the region of the prechamber that is opposite to the ejection ports and that is identified as the crevice volume (610) as shown in FIG. 6.

Figure 7:
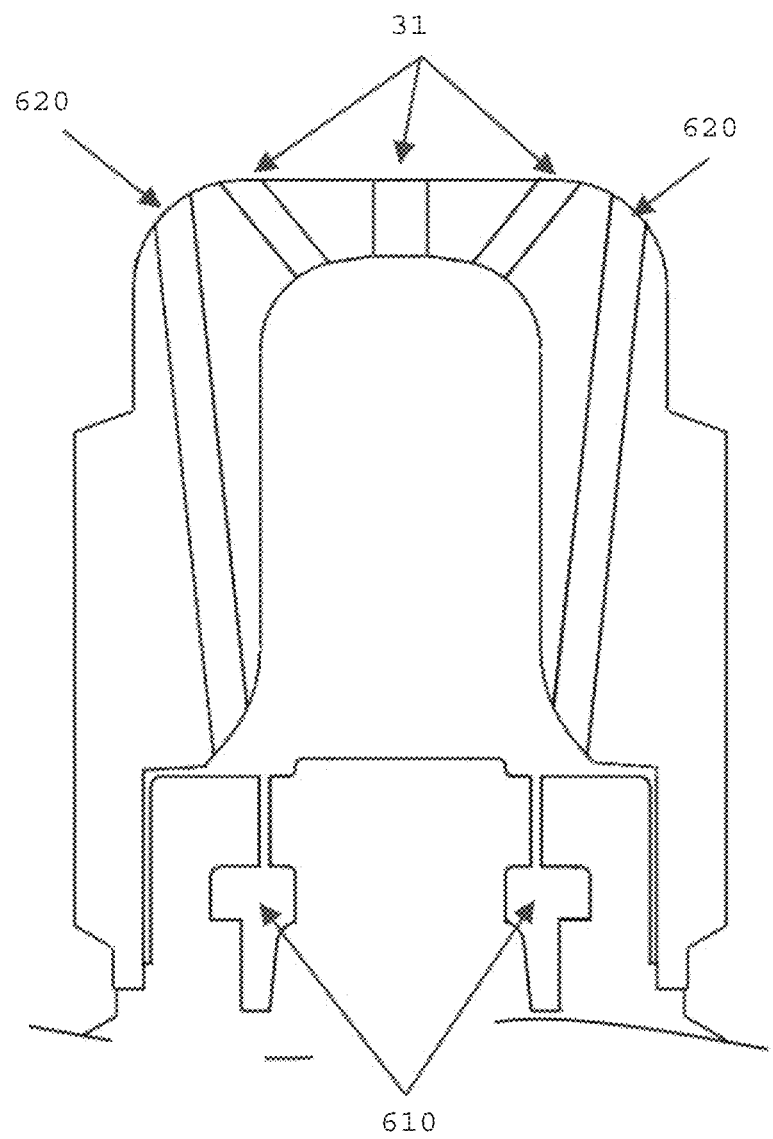
FIG. 7 depicts a prechamber spark plug with a large prechamber volume, a large spark-gap electrode assembly and auxiliary scavenging ports in accordance with certain embodiments.

In large volume prechambers and/or prechambers with large spark-gap electrode assembly, fuel rich gas mixtures, may only be obtained in regions adjacent to the ejection/scavenging ports. This condition may be improved with auxiliary scavenging ports that terminate in the region of otherwise poor scavenging. In certain embodiments, this region may be created by either the large spark-gap electrode assembly (410) as shown in the right schematic of FIG. 6, or by the large size of the prechamber and in the region that is remote from the conventional ejection/scavenging ports as shown in the left schematic of FIG. 6, or by the combination of large spark-gap electrode assembly and large prechamber volume as shown in FIG. 7.

Figure 8:
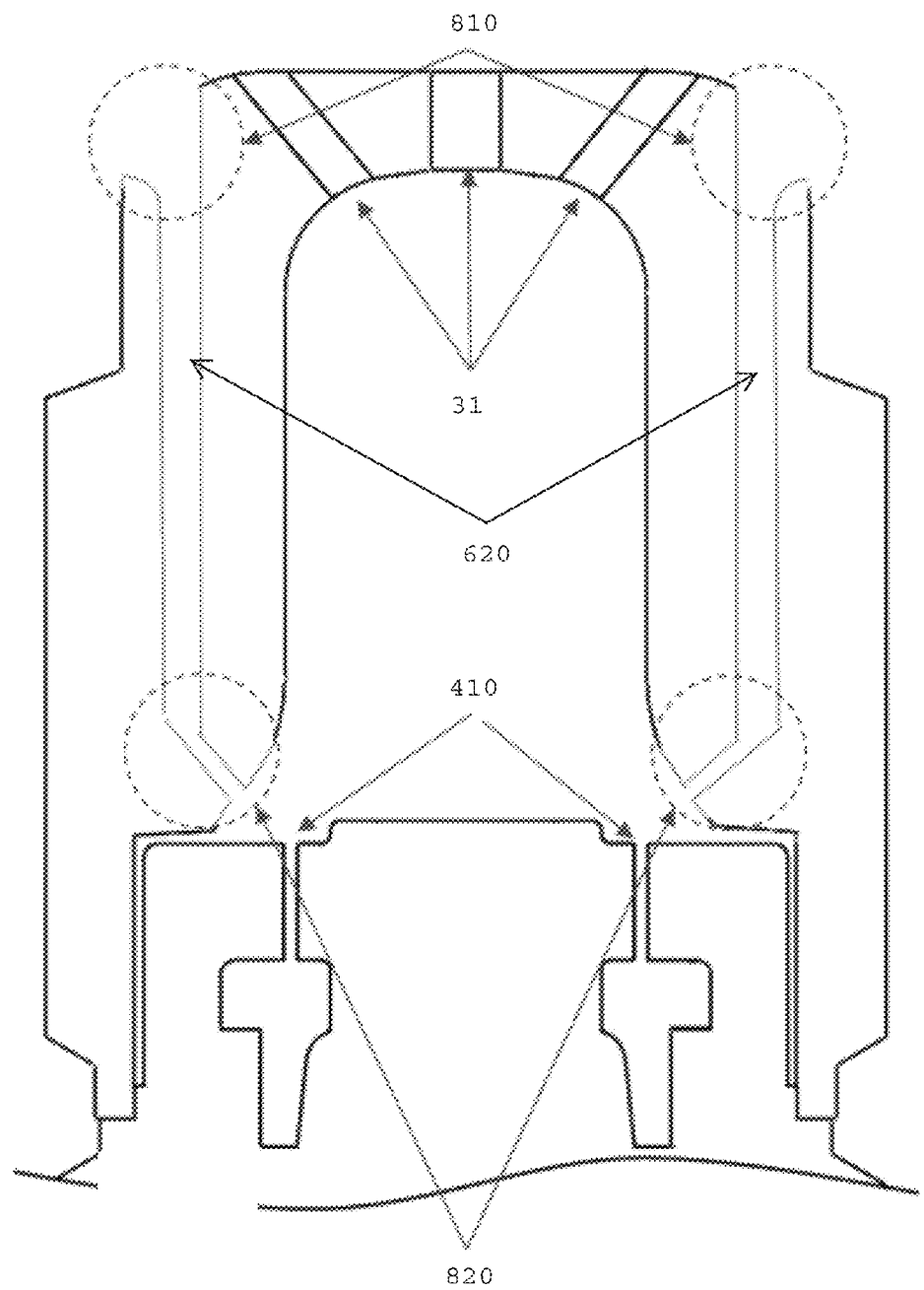
FIG. 8 depicts a prechamber spark plug including auxiliary scavenging ports with converging inlets and choked orifice areas in accordance with certain embodiments.

In certain embodiments, the auxiliary scavenging ports (620) may be configured to have a larger convergent inlet port and a smaller choked orifice area as shown in FIG. 8 in which sonic velocity is achieved during combustion in the prechamber. This configuration may provide the additional benefits of increasing the flow of fuel mixture admitted to the crevice volume (610) while minimizing the pressure drop during combustion in the prechamber. In certain embodiments, one or more auxiliary scavenging ports (620) may have a converging inlet area (810). In certain embodiments, one or more auxiliary scavenging ports (620) may have a choked orifice area (820).

In certain embodiments, larger prechamber volumes may be required to produce high power flame jets or with larger displacement engine cylinders. Also, larger spark-gap electrode assemblies may be required to improve durability in high power density engines. However, with large size prechambers and/or with prechambers that have large spark-gap electrode assembly, a poor scavenge of the crevice volume (610) may cause a significant deterioration of the preignition margin which then may limit the power rating of the engine. In certain embodiments, a poor scavenge of the crevice volume (610) may cause the flow velocity field of the fuel-air mixture distributions to be excessively uneven and may result in the deterioration of the misfire limit.

In certain embodiments, one or more auxiliary scavenging ports (620) may allow admission of fuel rich mixture to the crevice volume (610), thereby cooling the residual gases and preventing occurrence of preignition. In certain embodiments, more organized and powerful flow velocity fields may be obtained in the spark-gap electrode assembly region. This condition may result in a significant extension of the flammability limit and may significantly improve the combustion efficiency of the prechamber. In certain embodiments, passive prechambers using the active scavenge concept may increase the engine power output and reduce the emission of pollutants from engine combustion.

In certain embodiments, a pre-combustion chamber may comprise: a passive prechamber comprising: a prechamber comprising an external surface and an internal surface enclosing a prechamber volume; one or more ejection ports communicating between the external surface and the internal surface for introducing a fuel-air mixture into the prechamber volume; a spark-gap electrode assembly, comprising a primary electrode disposed within the prechamber volume; and one or more ground electrodes disposed within the prechamber volume and offset from the primary electrode to form one or more electrode gaps; a crevice volume (610); and one or more auxiliary scavenging ports (620) each comprising an inlet for communicating with a main combustion chamber and an outlet communicating with the crevice volume (610). The one or more auxiliary scavenging ports (620) may be configured for admitting fresh fuel-air mixture directly to the crevice volume (610) of the passive prechamber. The one or more auxiliary scavenging ports (620) may have a length over diameter ratio greater than about 1. The one or more auxiliary scavenging ports (620) may have a length over diameter ratio greater than about 3. The one or more auxiliary scavenging ports (620) may have a port axis substantially parallel to a longitudinal axis of the prechamber. At least one of the one or more auxiliary scavenging ports (620) has a converging inlet. The outlet of at least one of the one or more auxiliary scavenging ports (620) may comprise a choked orifice. The one or more auxiliary scavenging ports (620) may have an inlet axis defining an inlet angle and an outlet axis comprising an outlet angle, and the inlet angle may be different from the outlet angle. The one or more auxiliary scavenging ports (620) may be configured for inducing mixing of the fresh fuel-air mixture with residual gases in the passive prechamber. The one or more auxiliary scavenging ports (620) may be configured for generating a uniform, high velocity flow within the spark-gap electrode assembly. The outlet of each of the one or more auxiliary scavenging ports (620) may be proximate the spark-gap electrode assembly. The outlet of each of the one or more auxiliary scavenging ports (620) may be proximate enough to the spark-gap electrode assembly to directly affect the flow fields into the crevice volume (610). The outlet of each of the one or more auxiliary scavenging ports (620) may be remote from the one or more ejection ports. The one or more auxiliary scavenging ports (620) may be configured for generating a substantially reduced flame jet momentum from combustion in the passive prechamber. The one or more auxiliary scavenging ports (620) may be located at a periphery of the prechamber. The prechamber may define a prechamber volume of greater than about one thousand cubic millimeters. The spark-gap electrode assembly may have a volume greater than about 100 cubic millimeters.

In certain embodiments, a method of active scavenging may comprise: providing a prechamber comprising: an external surface and an internal surface enclosing a prechamber volume; one or more ejection ports communicating between the external surface and the internal surface for introducing a fuel-air mixture into the prechamber volume; a spark-gap electrode assembly, comprising: a primary electrode disposed within the prechamber volume; and one or more ground electrodes disposed within the prechamber volume and offset from the primary electrode to form one or more electrode gaps; and one or more auxiliary scavenging ports (620) each comprising an inlet for communicating with a main combustion chamber and an outlet communicating with a crevice volume (610) of the prechamber; introducing one or more fuel-air in-filling streams to the prechamber volume through the one or more holes; and introducing a spark across at least one of the one or more electrodes gaps to ignite the fuel-air mixture. The method may further comprise introducing one or more fresh fuel-air in-filling streams to the crevice volume (610) through the one or more auxiliary scavenging ports (620). The one or more auxiliary scavenging ports (620) may have a length over diameter ratio greater than about 1. The one or more auxiliary scavenging ports (620) may have a length over diameter ratio greater than about 3. The one or more auxiliary scavenging ports (620) may have a port axis substantially parallel to a longitudinal axis of the prechamber. At least one of the one or more auxiliary scavenging ports (620) may have a converging inlet. The outlet of at least one of the one or more auxiliary scavenging ports (620) may comprise a choked orifice. The one or more auxiliary scavenging ports (620) may have an inlet axis defining an inlet angle and an outlet axis comprising an outlet angle, and wherein the inlet angle is different from the outlet angle for at least one of the one or more auxiliary scavenging ports (620). The one or more auxiliary scavenging ports (620) may be configured for inducing mixing of the one or more fresh fuel-air in-filling streams with residual gases in the prechamber. The one or more auxiliary scavenging ports (620) may be configured for generating a uniform, high velocity flow within the spark-gap electrode assembly. The outlet of at least one of the one or more auxiliary scavenging ports (620) may be proximate the spark-gap electrode assembly. The outlet of each of the one or more auxiliary scavenging ports (620) may be proximate enough to the spark-gap electrode assembly to directly affect the flow fields into the crevice volume (610). The outlet of each of the one or more auxiliary scavenging ports (620) may be remote from the one or more ejection ports. The one or more auxiliary scavenging ports (620) may be configured for generating a substantially reduced flame jet momentum from combustion in the prechamber. The one or more auxiliary scavenging ports (620) may be located at a periphery of the prechamber. The prechamber may define a prechamber volume of greater than about one thousand cubic millimeters. The spark-gap electrode assembly may have a volume greater than about 100 cubic millimeters.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:
1. A pre-combustion chamber comprising:
 a passive prechamber comprising:
  a prechamber comprising an external surface and an internal surface enclosing a prechamber volume;
  one or more ejection ports communicating between the external surface and the internal surface for introducing a fuel-air mixture into the prechamber volume;
  a spark-gap electrode assembly, comprising
   a primary electrode disposed within the prechamber volume; and
   one or more ground electrodes disposed within the prechamber volume and offset from the primary electrode to form one or more electrode gaps;
  a volume surrounding the spark-gap electrode assembly; and
  one or more auxiliary scavenging ports each comprising an inlet for communicating with a main combustion chamber and an outlet communicating with the volume surrounding the spark-gap electrode assembly;
  wherein the one or more auxiliary scavenging ports are configured to transfer an amount of fuel-oxidizer mixture from the main combustion chamber into the volume surrounding the spark-gap electrode assembly of the prechamber;
  wherein the one or more auxiliary scavenging ports have a length over diameter ratio of at least 3;
  wherein the one or more auxiliary scavenging ports each has an inlet axis defining an inlet angle and an outlet axis comprising an outlet angle; and
  wherein the inlet angle is different from the outlet angle and the inlet angle is parallel to a longitudinal axis of the prechamber for generating a reduced flame jet momentum from combustion in the passive prechamber.

2. The pre-combustion chamber of claim 1, wherein the one or more auxiliary scavenging ports are configured for admitting fresh fuel-air mixture directly to the volume surrounding the spark-gap electrode assembly.

3. The pre-combustion chamber of claim 1, wherein at least one of the one or more auxiliary scavenging ports has a converging inlet and a choked orifice.

4. The pre-combustion chamber of claim 2, wherein the one or more auxiliary scavenging ports are configured for inducing mixing of the fresh fuel-air mixture with residual gases in the passive prechamber.

5. The pre-combustion chamber of claim 1, wherein the one or more auxiliary scavenging ports are configured for generating a uniform, high velocity flow within the spark-gap electrode assembly.

6. The pre-combustion chamber of claim 1, wherein the outlet of each of the one or more auxiliary scavenging ports is proximate the spark-gap electrode assembly.

7. The pre-combustion chamber of claim 6, wherein the outlet of each of the one or more auxiliary scavenging ports is proximate enough to the spark-gap electrode assembly to directly affect the flow fields into the volume surrounding the spark-gap electrode assembly.

8. The pre-combustion chamber of claim 1, wherein the outlet of each of the one or more auxiliary scavenging ports is remote from the one or more ejection ports.

9. The pre-combustion chamber of claim 1, wherein the one or more auxiliary scavenging ports are located at a periphery of the prechamber.

10. The pre-combustion chamber of claim 1, wherein the prechamber defines a prechamber volume of at least one thousand cubic millimeters; and wherein the spark-gap electrode assembly defines a volume of at least 100 cubic millimeters.

11. A method of active scavenging, comprising:
 providing a prechamber comprising:
  an external surface and an internal surface enclosing a prechamber volume;
  one or more ejection ports communicating between the external surface and the internal surface for introducing a fuel-air mixture into the prechamber volume;
  a spark-gap electrode assembly, comprising:
   a primary electrode disposed within the prechamber volume; and
   one or more ground electrodes disposed within the prechamber volume and offset from the primary electrode to form one or more electrode gaps;
  one or more auxiliary scavenging ports each comprising an inlet for communicating with a main combustion chamber and an outlet communicating with a volume surrounding the spark-gap electrode assembly of the prechamber;

wherein the one or more auxiliary scavenging ports are configured to transfer an amount of fuel-oxidizer mixture from the main combustion chamber into the volume surrounding the spark-gap electrode assembly of the prechamber;

wherein the one or more auxiliary scavenging ports have a length over diameter ratio of at least 3;

wherein the one or more auxiliary scavenging ports each has an inlet axis defining an inlet angle and an outlet axis comprising an outlet angle; and wherein the inlet angle is different from the outlet angle and the inlet angle is parallel to a longitudinal axis of the prechamber for generating a reduced flame jet momentum from combustion in the passive prechamber;

introducing one or more fuel-air in-filling streams to the prechamber volume through the one or more ejection ports; and introducing a spark across at least one of the one or more electrodes gaps to ignite the fuel-air mixture.

12. The method of claim 11, further comprising introducing one or more fresh fuel-air in-filling streams to the volume surrounding the spark-gap electrode assembly through the one or more auxiliary scavenging ports.

13. The method of claim 11, wherein the outlet of at least one of the one or more auxiliary scavenging ports is proximate enough to the spark-gap electrode assembly to directly affect the flow fields into the volume surrounding the spark-gap electrode assembly.

* * * * *